US012558926B2

(12) United States Patent
De Martino et al.

(10) Patent No.: US 12,558,926 B2
(45) Date of Patent: Feb. 24, 2026

(54) DEVICE AND METHOD FOR FIXING A SENSOR TO A TIRE

(71) Applicant: PROMETEON TYRE GROUP S.R.L., Milan (IT)

(72) Inventors: Mario De Martino, Milan (IT); Fabio Mario Montanaro, Sesto San Giovanni (IT); Alexandre Bregantim, Milan (IT); Massimo Brusarosco, Milan (IT)

(73) Assignee: PROMETEON TYRE GROUP S.R.L., Milan (IT)

( * ) Notice: Subject to any disclaimer, the term of this patent is extended or adjusted under 35 U.S.C. 154(b) by 341 days.

(21) Appl. No.: 18/285,590

(22) PCT Filed: Apr. 6, 2022

(86) PCT No.: PCT/IB2022/053200
§ 371 (c)(1),
(2) Date: Oct. 4, 2023

(87) PCT Pub. No.: WO2022/214988
PCT Pub. Date: Oct. 13, 2022

(65) Prior Publication Data
US 2024/0367466 A1    Nov. 7, 2024

(30) Foreign Application Priority Data

Apr. 7, 2021    (IT) ........................ 102021000008642
Jul. 28, 2021    (IT) ........................ 102021000020147

(51) Int. Cl.
*B60C 23/04*         (2006.01)
(52) U.S. Cl.
CPC ................................ *B60C 23/0493* (2013.01)
(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 8,984,936 B2 *    3/2015    Brusarosco ........... B60C 25/005
73/146
9,096,103 B2 *    8/2015    Brusarosco ......... B60C 23/0408
(Continued)

FOREIGN PATENT DOCUMENTS

CN         105531126 B   *   4/2018    ......... B60C 23/0493
DE     102006020632 B4      4/2014
(Continued)

OTHER PUBLICATIONS

International Search Report and Written Opinion for PCT/IB2022/053200, dated Oct. 14, 2022.
(Continued)

*Primary Examiner* — Andre J Allen
(74) *Attorney, Agent, or Firm* — Troutman Pepper Locke LLP

(57)         ABSTRACT
Device for fixing a sensor to a tire, which device comprises at least one base provided with a seat adapted to house at least partially a first portion of at least one sensor for tires, and at least one cover adapted to house at least partially a second portion of the sensor, wherein the cover comprises at least one seat adapted to house at least partially the base, wherein the base comprises at least one first portion which is arranged adjacent to the seat of the base and at least one second portion which at least partially surrounds the seat of the base, wherein the cover comprises at least one first portion which is adapted to at least partially surround the seat of the cover and at least one second portion which is adapted to at least partially surround the second portion of the sensor, wherein the first portion of the base comprises at least one support surface on one side of the base opposite the second portion of the base, wherein the first portion of the cover comprises at least one support surface on a side of the cover opposite the second portion of the cover, wherein the first portion of the base comprises at least one protuberance
(Continued)

which at least partially surrounds the first portion of the base. The present description also relates to a method which can use said device to fix a sensor to a tire.

19 Claims, 6 Drawing Sheets

(58) Field of Classification Search
CPC . B60C 23/0433; B60C 23/0493; B60C 19/00; B60C 23/04; B60C 23/0462; B60C 23/041; B60C 23/20; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/02; B60C 23/0452; B60C 23/0498; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/00318; B60C 23/00; B60C 23/003; B60C 23/00372; B60C 23/0403; B60C 23/0406; B60C 23/0472; B60C 23/066; B60C 29/02; B60C 23/006; B60C 11/00; B60C 23/0454; B60C 23/044; B60C 23/0455; B60C 25/002; B60C 23/008; B60C 23/0483; B60C 23/0461; B60C 23/0474; B60C 23/0489; B60C 23/0415; B60C 23/0491; B60C 29/064; B60C 23/00363; B60C 23/0471; B60C 23/0459; B60C 23/0481; B60C 23/0476; B60C 11/0318; B60C 23/0477; B60C 2200/02; B60C 23/002; B60C 23/0437; B60C 2019/005; B60C 23/0405; B60C 23/042; B60C 23/0422; B60C 23/0423; B60C 23/0466; B60C 13/001; B60C 29/06; B60C 25/132; B60C 23/0427; B60C 23/0447; B60C 23/0449; B60C 9/18; B60C 25/00; B60C 23/065; B60C 23/0484; B60C 23/0486; B60C 19/003; B60C 23/00336; B60C 13/00; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 2200/04; B60C 2200/06; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22
USPC .................................................. 73/146–146.8
See application file for complete search history.

(56) References Cited

U.S. PATENT DOCUMENTS

| | | | | |
|---|---|---|---|---|
| 9,884,525 B2 * | 2/2018 | Brusarosco | ........ | B29D 30/0061 |
| 10,836,222 B2 * | 11/2020 | Stewart | .............. | B60C 23/0452 |
| 11,420,487 B2 * | 8/2022 | Dodani | .............. | B60C 23/0493 |
| 11,628,695 B2 * | 4/2023 | West | .................. | B60C 23/0493 |
| | | | | 73/146.3 |
| 2023/0182513 A1 * | 6/2023 | Broadfield | ........ | B60C 23/00318 |
| | | | | 340/442 |

FOREIGN PATENT DOCUMENTS

| | | | | | |
|---|---|---|---|---|---|
| DE | 107539039 | A | 1/2018 | | |
| DE | 102017210935 | A1 * | 1/2019 | ......... | B60C 23/0493 |
| EP | 1038698 | A2 | 9/2000 | | |
| EP | 3763552 | A1 * | 1/2021 | ......... | B60C 23/0493 |
| EP | 4582246 | A1 * | 7/2025 | ......... | B60C 23/0493 |
| WO | 2010092171 | A2 | 8/2010 | | |
| WO | WO-2015019283 | A1 * | 2/2015 | ......... | B60C 23/0493 |
| WO | WO-2024107805 | A1 * | 5/2024 | ........... | B60C 23/041 |

OTHER PUBLICATIONS

International Preliminary Report on Patentability for PCT/IB2022/053200, dated Apr. 6, 2023.

* cited by examiner

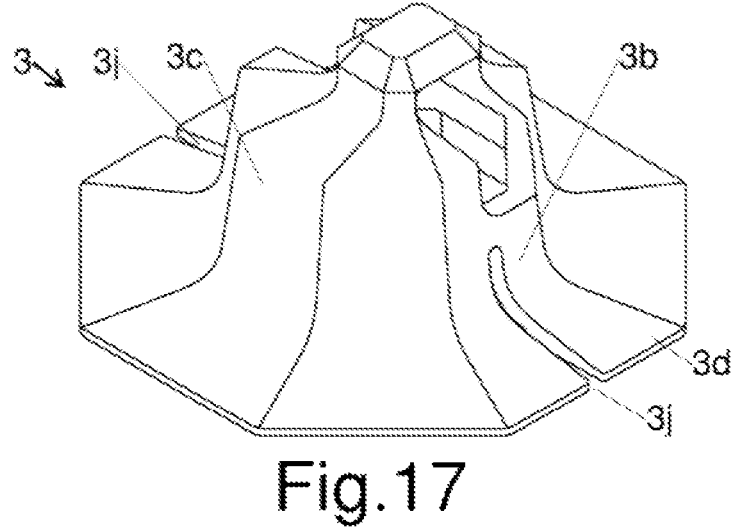
Fig.17
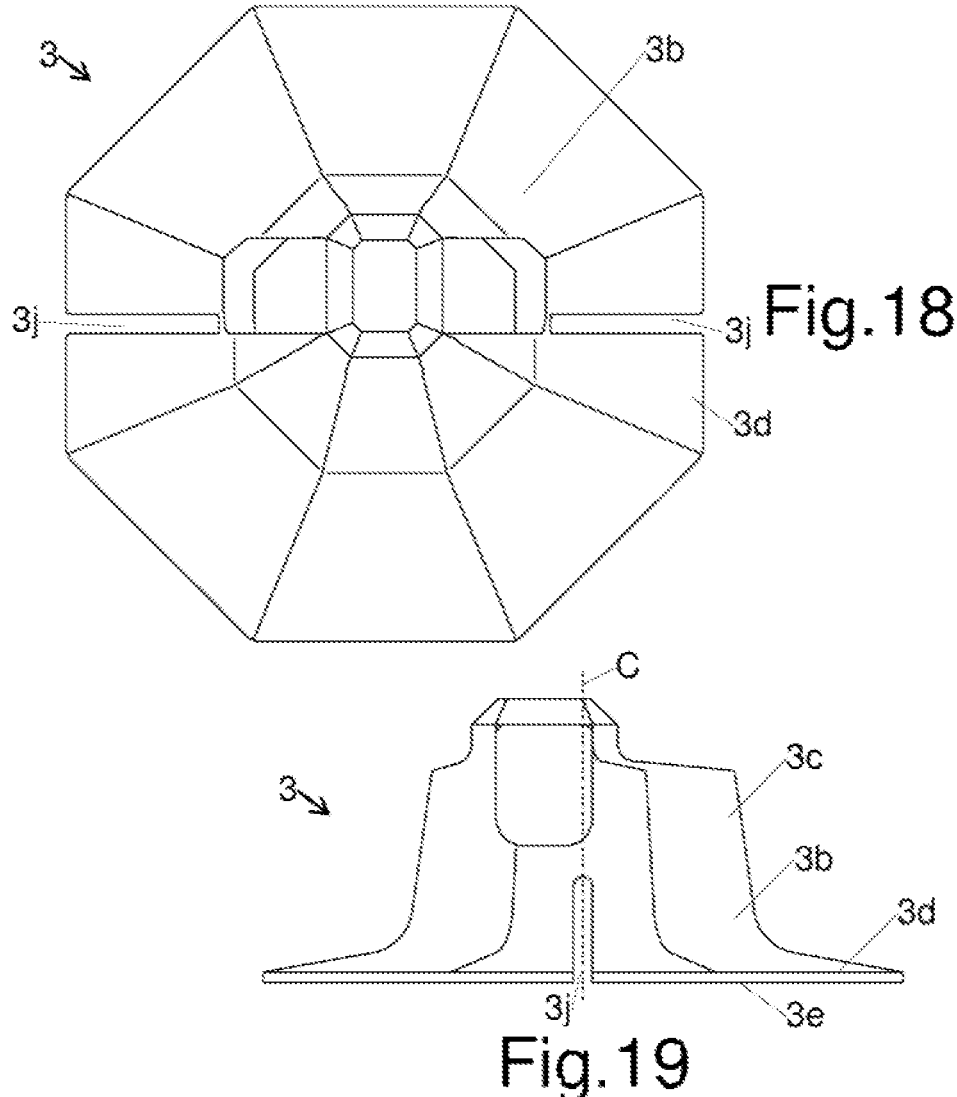
Fig.18
Fig.19

DEVICE AND METHOD FOR FIXING A SENSOR TO A TIRE

CROSS-REFERENCE TO RELATED APPLICATIONS

This application is a national stage application under 35 U.S.C. § 371 from PCT Application No. PCT/IB2022/053200, filed Apr. 6, 2022, which claims the priority benefit of Italian Patent Application Nos. 102021000008642, filed Apr. 7, 2021, and 102021000020147, filed Jul. 28, 2021, which are each hereby incorporated by reference in their entirety.

TECHNICAL FIELD OF DESCRIPTION

The present description relates to a device for fixing a sensor to a tire. The present description also relates to a method which can use said device to fix a sensor to a tire.

BACKGROUND OF THE DESCRIPTION

DE 102006020632 B4 describes a device for fixing a sensor to a tire according to the preamble of claim 1. The base of said known device is formed by a protective layer which is free to move with respect to the sensor and the tire, as it is not fixed to the latter by means of adhesives. The protective layer is made of PTFE to improve its movement with respect to the sensor and the tire.

Some drawbacks of this known device consist in the poor stability in retaining the sensor in the cover, due to the shape and material of the base, in the poor adhesion of the device to the tire, due to the non-stick material of the base, and in the heat generated by friction between the inner walls of the tire and the outer walls of the sensor, which heat can alter the temperature measurement in the tire.

SUMMARY OF THE DESCRIPTION

The object of the present description is therefore to provide a device free from such drawbacks. Said object is achieved with a device and a method, the main features of which are specified in the attached claims, to be considered an integral part of the present description.

Thanks to the particular structure of the cover and the base, the device according to the present description guarantees a high stability of the sensor, at the same time reducing the points of contact of the sensor with the base and the cover, so as to also reduce the heat due to friction.

Furthermore, the device according to the present description guarantees the adhesion of the sensor to the tire for the entire duration of the life of the tire, while protecting both the tire from the sensor and the sensor from mechanical stresses due to the deformations of the tire during use.

Thanks to a preferred shape of the seat of the base, the lower edge of the sensor is spaced from the lower edge of the seat, so as to avoid wear of the sensor and/or of the base in an area of high mechanical stress.

Thanks to a preferred conformation of the cover, the sensor can be protected from any balancing masses, for example spheres or sand, released into the tire, even if the cover comprises one or more openings that allow one or more portions of the sensor, in particular a protrusion containing an antenna, to project outward to widen the antenna transmission range.

The cover may comprise a particular cavity which protects an opening of the sensor from the balancing masses and is connected with the outside, so as to allow a precise and reliable measurement of the pressure in the tire.

The base and the cover preferably comprise fin-shaped protuberances which improve their mutual stability and their attachment to the tire.

The base and/or the cover preferably have a substantially truncated pyramid shape which, especially if having an octagonal section, has proved to be more resistant and better adaptable to the curved surface of the tire than cylindrical or frustoconical shapes.

Furthermore, the device according to the present description is simpler and cheaper to manufacture than similar devices in which the cover and base are made in one piece.

The base and/or the cover of the device may comprise particular notches and/or grooves which favor the cooling of the sensor and/or the deformation of the device to adapt to corresponding deformations of the tire, so as to improve the reliability and resilience of the device during use.

The method for fixing the sensor uses at least one layer of adhesive applied both under the cover and under the base, in order to improve the adhesion of the device to the tire. A channel which can be filled with this adhesive is preferably formed between the base and the cover to improve their mutual union.

BRIEF DESCRIPTION OF THE DRAWINGS

Further advantages and features of the device and of the method according to the present description will become evident to those skilled in the art from the following detailed description of some embodiments, to be considered as non-limiting examples, with reference to the attached drawings in which:

FIG. 17 is an axonometric view of an alternative embodiment of the cover of the device;

FIG. 18 is a top view of the cover of FIG. 17;

FIG. 19 is a side view of the cover of FIG. 17.

EXEMPLARY EMBODIMENTS

Figures 1, 2, 3, 4, 5, 6:
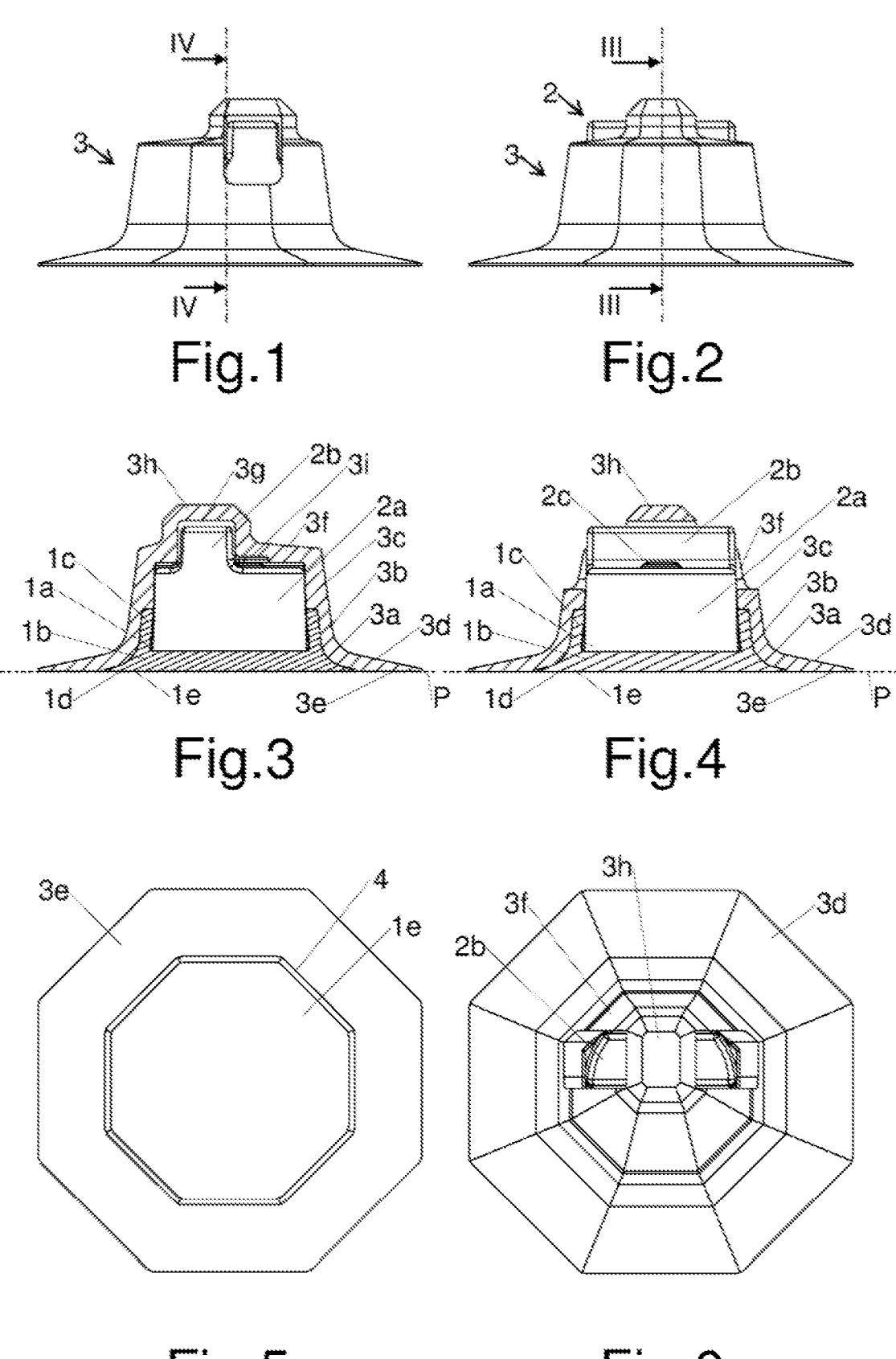
FIG. 1 is a side view of the device comprising a sensor.
FIG. 2 is a rear view of the device of FIG. 1.
FIG. 3 is the section III-III of FIG. 2.
FIG. 4 is the section IV-IV of FIG. 1.
FIG. 5 is a bottom view of the device of FIG. 1.
FIG. 6 is a top view of the device of FIG. 1.
Figure 7:
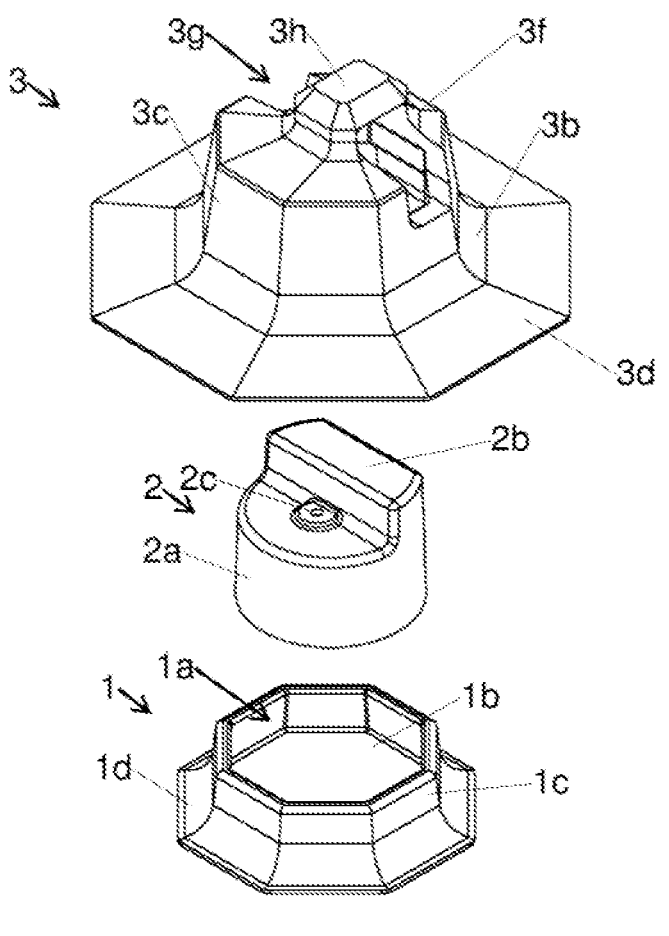
FIG. 7 is an exploded view of the device of FIG. 1.
Figures 8, 9:
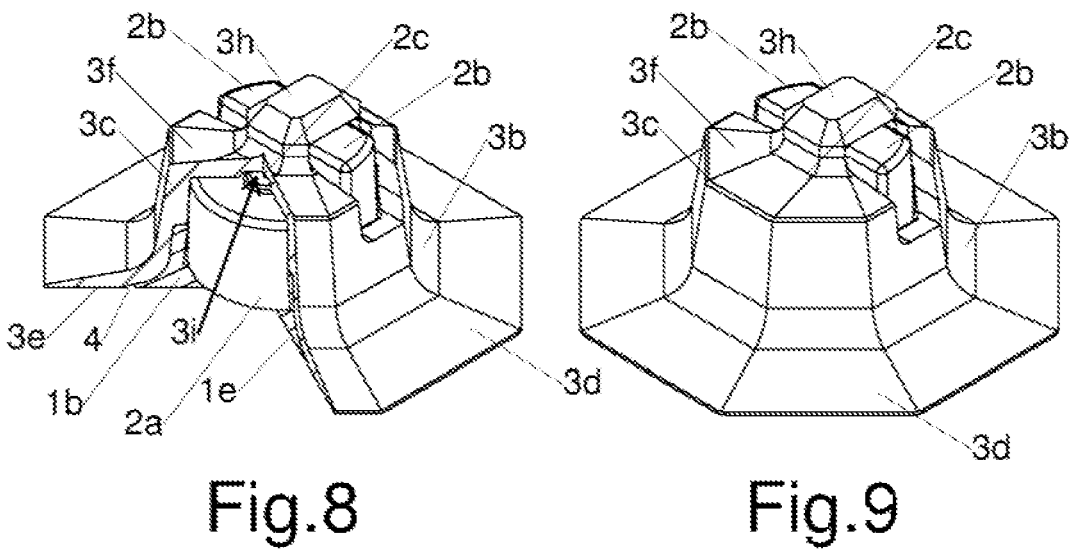
FIG. 8 is a partially sectioned axonometric view of the device of FIG. 1.
FIG. 9 is an axonometric view of the device of FIG. 1.
Figure 10:
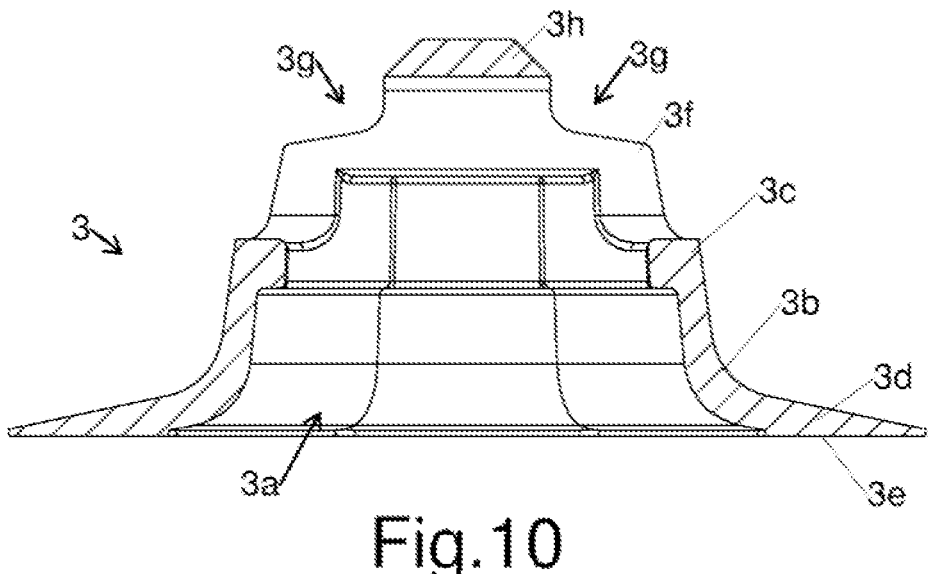
FIGS. 10 and 11 are enlarged sections of the cover of the device of FIG. 1.
Figure 11:
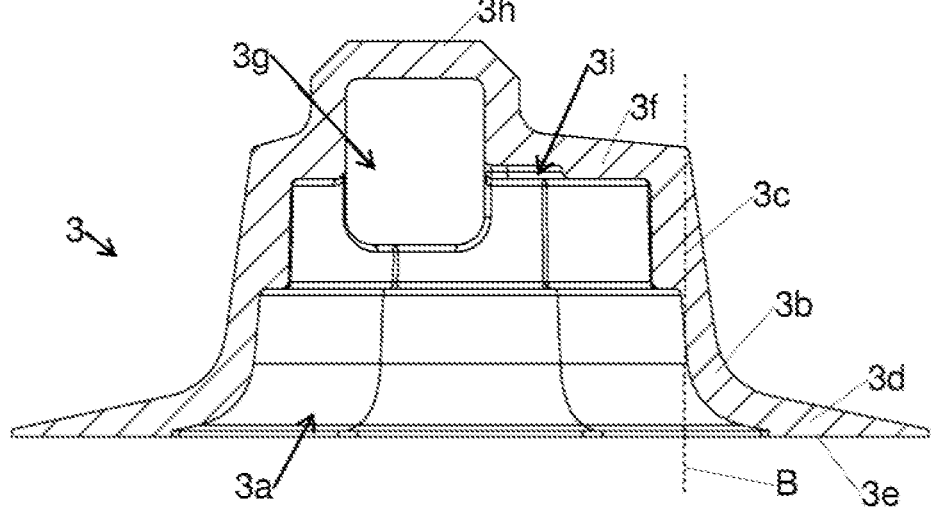
Figure 12:
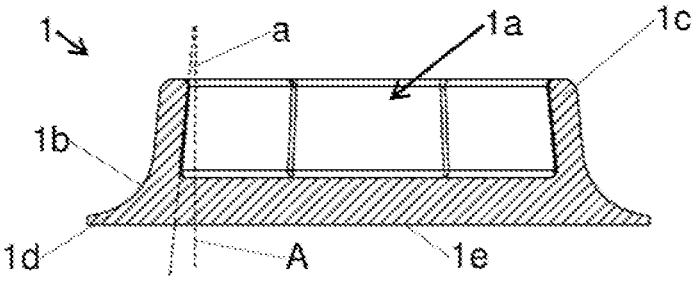
FIG. 12 is an enlarged section of the base of the device of FIG. 1.

As shown in FIGS. 1 to 12, an embodiment of the device comprises at least one base 1 provided with a seat 1a adapted to house at least partially a first portion (lower in the figures) of at least one sensor 2 for tires, and at least one cover 3 suitable to house at least partially a second portion (upper in the figures) of the sensor 2. The cover 3 comprises at least one seat 3a suitable to house at least partially, in particular completely, the base 1, so that the sensor 2 can be arranged between the base 1 and the cover 3.

The sensor 2 may comprise a container 2a, for example with a substantially cylindrical or frusto-conical shape, having a protuberance 2b obtained on one of its bases (upper in the figures), in particular to house an antenna for transmitting radio signals. The container 2a may also comprise at least one opening 2c for the transfer of fluids between the outside and the inside of the sensor 2, in particular from/to a pressure sensor arranged in the sensor 2. The sensor 2 may also comprise a temperature sensor disposed in the container 2a and a source of electric energy, so that the sensor 2 can measure the temperature and/or the pressure in a tire and transmit the measured values outside the tire through the antenna arranged in the protuberance 2b.

The base 1 comprises at least one first portion 1b which is arranged adjacent to the seat 1a and at least one second portion 1c which surrounds at least partially, in particular completely, the seat 1a.

The first portion 1b of the base 1 comprises at least one protuberance 1d which at least partially, in particular completely, surrounds the first portion 1b of the base 1, and at least one support surface 1e on one side of the base 1 opposite the second portion 1c of the base 1 The support surface 1e of the base 1 is adapted to be joined to an internal surface of a tire, in particular it is flat. The protuberance 1d in particular comprises at least one fin which tapers towards the outside of the base 1.

The cover 3 comprises at least one first portion 3b which is adapted to at least partially, in particular completely, surround the seat 3a of the cover 3 and at least one second portion 3c which is adapted to at least partially surround the second portion of the sensor 2.

The first portion 3b of the cover 3 comprises at least one protuberance 3d which at least partially, in particular completely, surrounds the first portion 3b of the cover 3, and at least one support surface 3e on one side of the cover 3 opposite the second portion 3c of the cover 3. The protuberance 3d of the cover 3 preferably comprises an external portion of the seat 3a of the cover 3, which external portion is adapted to house at least partially, in particular completely, the protuberance 1d of the base 1. The support surface 3e of the cover 3 is adapted to be joined to an internal surface of a tire, in particular it is flat. In particular, the protuberance 3d comprises at least one fin which tapers towards the outside of the cover 3.

The support surfaces 1e, 3e of the base 1 and of the cover 3 are preferably arranged substantially on the same plane P when the base 1 is arranged in the seat 3a of the cover 3. The outer edge of the support surface 1e of the base 1 and the inner edge of the support surface 3e of the cover 3 are preferably shaped to be spaced apart when the base 1 is arranged in the seat 3a of the cover 3 to form at least one channel 4 which at least partially, in particular completely, surrounds the first portion 1b of the base 1.

The cover 3 may comprise at least one third portion 3f which at least partially covers the second portion 3c of the cover 3 and the sensor 2, when this is arranged under the cover 3. One or more openings 3g may be made in the second portion 3c and/or in the third portion 3f of the cover 3. In particular, the cover 3 comprises at least two openings 3g made between the second portion 3c and the third portion 3f, so as to house portions of the protuberance 2b of the sensor 2 in the openings 3g.

The cover 3 may comprise at least one fourth portion 3h which projects outwards from the third portion 3f of the cover 3 and/or is arranged between the two openings 3g. In particular, the fourth portion 3h of the cover 3 forms a bridge which connects two parts of the third portion 3f of the cover 3, so as to cover at least one portion of the protuberance 2b of the sensor 2.

The cover 3 may comprise at least one cavity 3i which is formed in the third portion 3f of the cover 3 and opens towards at least one of the openings 3g, so as to allow the transfer of fluids between the outside of the cover 3 and the inside of the sensor 2 through the openings 3g, the cavity 3i and the opening 2c of the sensor 2.

The seat 1a, 3a and/or the first portion 1b, 3b and/or the second portion 1c, 3c of the base 1 and/or of the cover 3 preferably have a substantially prismatic or tapered shape, in particular truncated pyramidal, more particularly truncated pyramidal with a substantially octagonal section, so that the sensor 2 can come into contact with the internal side wall of the seat 1a of the base at eight contact points. The internal side walls of the seat 1a of the base 1 preferably form an angle a of 1°-10°, in particular 5°-6°, with a reference axis or plane A parallel to the longitudinal axis of the base 1.

The external side walls of the first portion 1b of the base 1 are preferably more inclined (i.e. they form a greater angle) than the external side walls of the second portion 1c of the base 1 with respect to a reference axis or plane A parallel to the longitudinal axis of the base 1. The external side walls of the first portion 1b of the base 1 are preferably connected by means of a concave portion to the external side walls of the second portion 1c of the base 1.

The external side walls of the first portion 3b of the cover 3 are preferably more inclined (i.e. they form a greater angle) than the external side walls of the second portion 3c of the cover 3 with respect to an axis or reference plane B parallel to the longitudinal axis of the cover 3. The outer side walls of the first portion 3b of the cover 3 are preferably connected by a concave portion to the adjacent outer side walls of the second portion 3c of the cover 3.

The external side walls of the first portion 1b and of the second portion 1c of the base 1 and the respective internal side walls of the seat 3a of the cover 3 have substantially the same shape and dimensions.

The internal side walls of the second portion 3c of the cover 3 have a substantially prismatic shape, in particular with a substantially octagonal section, so that the sensor 2 can come into contact with the internal side wall of the second portion 3c on eight contact lines.

The base 1 and the cover 3 are made of an elastomer, in particular rubber.

Figure 13:
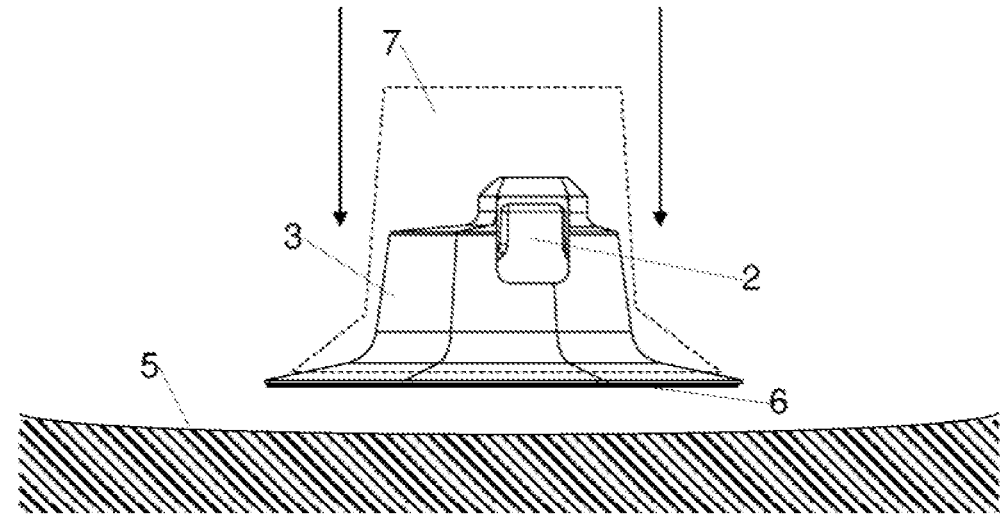
FIG. 13 shows a step of the method of fixing the device of FIG. 1.

As shown in FIG. 13, in a first step of the fixing method a sensor 2 is inserted in the base 1 and covered by the cover 3, after which, in a second step, the assembly of base 1, sensor 2 and cover 3 is applied to an internal surface of a tire 5 by means of at least one layer of adhesive 6 disposed on the support surface 1e of the base 1 and on the support surface 3e of the cover 3. This application is preferably carried out by means of an applicator 7 (shown with dashed lines), which comprises at least one seat in which the cover 3 is arranged to press it with the sensor 2 and the base 1 in the direction of the arrows onto the surface of the tire 5.

Figure 14:
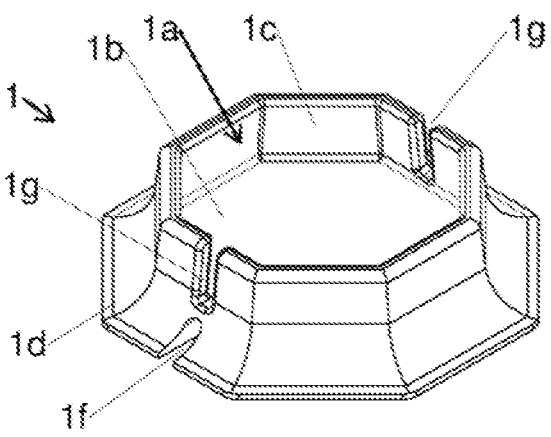
FIG. 14 is an axonometric view of an alternative embodiment of the base of the device.
Figure 15:
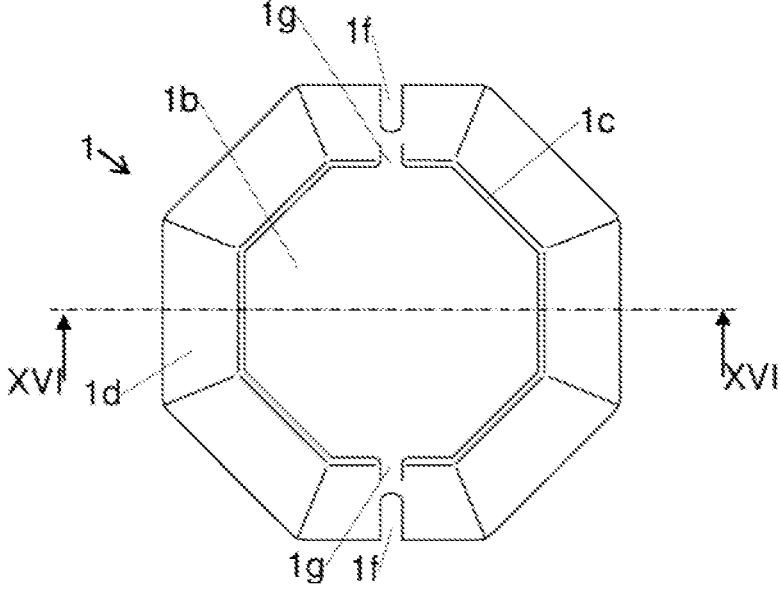
FIG. 15 is a top view of the base of FIG. 14.
Figure 16:
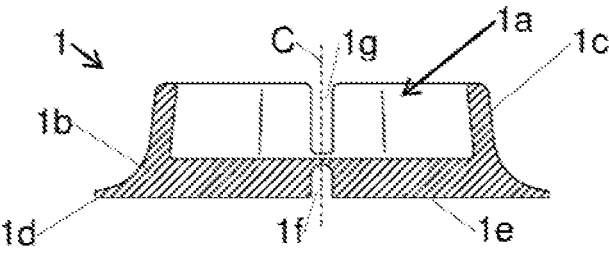
FIG. 16 is the section XVI-XVI of FIG. 15.

FIGS. 14 to 16 show an alternative embodiment of the device, which differs from the first embodiment in that the first portion 1b of the base 1 may comprise at least one groove 1f which is open towards the support surface 1e. Preferably, the groove 1f is rectilinear and/or passes through the center of the support surface 1e. The ends of the groove 1f are preferably open towards the protuberance 1d, i.e. towards the lateral edges of the base 1. Furthermore, this alternative embodiment may comprise one or more notches 1*g* formed in the upper edge of the second portion 1*c* of the base 1. Preferably, the notches 1*g* are arranged on a plane C passing through the groove 1*f* and are substantially perpendicular to this groove 1*f*. Preferably, the plane C is substantially perpendicular to the support surface 1*e*.

FIGS. 17 to 19 show an alternative embodiment of the device, which differs from the first embodiment in that the first portion 3*b* of the cover 3 can comprise one or more grooves 3*j* which are open towards the support surface 3*e*. Preferably, the grooves 3*j* are rectilinear and/or oriented towards the center of the support surface 3*e*. The ends of the grooves 3*j* are preferably open towards the seat 3*a* and/or towards the protuberance 3*d*. Preferably, the grooves 3*j* are arranged on a plane C substantially perpendicular to the support surface 3*e*. In use, the base 1 and/or the cover 3 of the alternative embodiment are preferably applied onto the surface of the tire 5, so that the planes C of the base 1 and/or the cover 3 are substantially parallel to the axis of the tire 5.

Variations or additions may be made by those skilled in the art to the embodiments described and illustrated herein while remaining within the scope of the following claims. In particular, further embodiments may comprise the technical characteristics of one of the following claims with the addition of one or more technical characteristics described in the text or illustrated in the drawings, taken individually or in any reciprocal combination.

The invention claimed is:

1. A device for fixing a sensor to a tire, which device comprises at least one base provided with a seat adapted to house at least partially a first portion of at least one sensor for tires, and at least one cover adapted to house at least partially a second portion of the sensor, wherein the cover comprises at least one seat adapted to house at least partially the base, wherein the base comprises at least one first portion which is arranged adjacent to the seat of the base and at least one second portion which at least partially surrounds the seat of the base, wherein the cover comprises at least one first portion which is adapted to at least partially surround the seat of the cover and at least one second portion which is adapted to at least partially surround the second portion of the sensor, wherein the first portion of the base comprises at least one support surface on one side of the base opposite the second portion of the base, wherein the first portion of the cover comprises at least one support surface on a side of the cover opposite the second portion of the cover, wherein the support surface of the cover is adapted to be joined to an internal surface of a tire, wherein the first portion of the base comprises at least one protuberance that at least partially surrounds the first portion of the base.

2. The device according to claim 1, wherein the first portion of the cover comprises at least one protuberance which at least partially surrounds the first portion of the cover.

3. The device according to claim 2, wherein the protuberance of the cover comprises an external portion of the seat of the cover, which external portion is adapted to at least partially house the protuberance of the base.

4. The device according to claim 1, wherein the protuberance of the base of the cover comprises at least one fin which tapers towards the outside of the base.

5. The device according to claim 1, wherein the outer edge of the support surface of the base and the inner edge of the support surface of the cover are shaped to be spaced apart when the base is arranged in the seat of the cover to form at least one channel which at least partially surrounds the first portion of the base.

6. The device according to claim 1, wherein the cover comprises at least one third portion which at least partially covers the second portion of the cover.

7. The device according to claim 6, wherein the cover comprises at least one fourth portion which projects outwards from the third portion of the cover and forms a bridge connecting two parts of the third portion of the cover.

8. The device according to claim 6, wherein one or more openings are formed in the third portion of the cover.

9. The device according to claim 8, wherein the cover comprises at least one cavity which is formed in the third portion of the cover and opens towards at least one of the openings.

10. The device according to claim 1, wherein the seat and/or the first portion and/or the second portion of the base and/or of the cover have a substantially prismatic or tapered shape, in particular truncated pyramidal, more particularly truncated pyramidal with a substantially octagonal section.

11. The device according to claim 1, wherein the external side walls of the first portion of the base and/or of the cover are more inclined than the external side walls of the second portion respectively of the base or of the cover with respect to an axis or reference plane parallel to the longitudinal axis of the base or of the cover respectively.

12. The device according to claim 1, wherein the base and the cover are made of an elastomer.

13. The device according to claim 1, wherein the first portion of the base comprises at least one groove which is open towards the support surface of the base.

14. The device according to claim 1, wherein the base comprises one or more notches formed in the upper edge of the second portion of the base.

15. The device according to claim 1, wherein the first portion of the cover comprises one or more grooves which are open towards the support surface of the cover.

16. A method for fixing a sensor to a tire by means of a device which comprises at least one base provided with a seat adapted to at least partially house a first portion of at least one sensor for tires, and at least one cover adapted to house at least partially a second portion of the sensor, wherein the cover comprises at least one seat adapted to house at least partially the base, wherein the base comprises at least one first portion which is arranged adjacent to the seat of the base and at least one second portion which at least partially surrounds the seat of the base, wherein the cover comprises at least one first portion which is adapted to at least partially surround the seat of the cover and at least one second portion which is adapted to at least partially surround the second portion of the sensor, wherein the first portion of the base comprises at least one support surface on one side of the base opposite the second portion of the base, wherein the first portion of the cover comprises at least one support surface on a side of the cover opposite the second portion of the cover, wherein the support surface of the cover is adapted to be joined to an internal surface of a tire, wherein the first portion of the base comprises at least one protuberance that at least partially surrounds the first portion of the base, and in that the method comprises the following operating steps:

inserting the sensor between the base and the cover;

applying the assembly of base, sensor and cover to a surface of a tire by means of at least one layer of adhesive disposed on the support surface of the base and on the support surface of the cover.

17. The method according to claim 16, wherein said device is a device according to claim 1.

18. The device according to claim 2, wherein the protuberance of the cover comprises at least one fin which tapers towards the outside of the cover.

19. The device according to claim 1, wherein one or more openings are formed in the second portion of the cover.

* * * * *